United States Patent [19]

Basanese et al.

[11] Patent Number: 4,864,098
[45] Date of Patent: Sep. 5, 1989

[54] HIGH POWERED BEAM DUMP

[75] Inventors: Robert E. Basanese, San Jose; Dale E. Koop; Robert E. Wallace, both of Sunnyvale, all of Calif.

[73] Assignee: Rofin-Sinar, Inc., San Jose, Calif.

[21] Appl. No.: 196,481

[22] Filed: May 19, 1988

[51] Int. Cl.⁴ .............................................. B23K 27/00
[52] U.S. Cl. ........................... 219/121.61; 219/121.67; 219/121.84
[58] Field of Search ...................... 219/121.67, 121.72, 219/121.74, 121.85, 121.7, 121.84, 121.6, 121.61; 350/311, 314; 372/109

[56] References Cited

U.S. PATENT DOCUMENTS

| | | | |
|---|---|---|---|
| 3,612,814 | 10/1971 | Houlderoft ...................... | 219/121.72 |
| 3,778,585 | 11/1973 | Mallozzi et al. ................ | 219/121.74 |
| 3,813,511 | 5/1974 | Staal ............................... | 219/121.85 |
| 4,409,463 | 10/1983 | Duruz et al. .................... | 219/121.67 |

Primary Examiner—William L. Sikes
Assistant Examiner—B. R. R. Hollowey
Attorney, Agent, or Firm—Donald C. Feix

[57] ABSTRACT

A high powered beam dump apparatus and method for absorbing the power of a high power laser, while the beam is shuttered off from contact with a workpiece, comprises two principal features. A reflecting cone reflects and spreads the high power laser beam outwardly from the axis of a high power laser beam when the beam dump is positioned with the axis of the cone coaxial with the axis of the incoming laser beam. An absorber extends circumferentially about the reflecting cone surface and absorbs the power of the beam as reflected from the reflecting cone surface. The materials and surface finishes of the conical reflecting surface and the absorber and the angle of the reflecting cone are related to the wavelength of the high power laser beam with which the beam dump is associated so as to absorb essentially all of the power of the laser beam when the beam dump is moved into the beam shuttered off position.

8 Claims, 2 Drawing Sheets

HIGH POWERED BEAM DUMP

BACKGROUND OF THE INVENTION

This invention relates to a high power beam dump for absorbing the power of a high power laser beam while the laser beam is shuttered off from contact with a workpiece.

This invention relates particularly to a high power beam dump which is positioned directly in the path and coaxially with the laser beam and which is constructed to absorb essentially all of the power of the laser beam.

High power lasers, such as, for example, carbon dioxide lasers, are used for cutting and performing other operations on workpieces. The high power laser and workpiece must be carefully aligned to obtain the desired accuracy of the operation to be performed on the workpiece. During the time that the workpiece and laser are being aligned, the high power laser beam must be shuttered off from contact with the workpiece.

The power of the laser beam must therefore be absorbed without damaging the shuttering-off apparatus.

Typically, in previous laser shuttering techniques, a mirror has been placed in front of the beam to deflect the beam into an area away from the workpiece and outside of the beam path of the laser during realignment.

SUMMARY OF THE INVENTION

It is a primary object of the invention to position a beam dump coaxially in the path of the laser beam so as to eliminate the need for mirrors that have been used in prior apparatus.

It is a related object to construct a light weight and highly effective beam dump light trap which can be readily moved into and out of the path of the high power laser beam in the course of shuttering off the high power laser beam from the workpiece.

A high power beam dump constructed in accordance with the present invention comprises two principal components.

The high power beam dump has a reflecting cone surface which reflects and spreads the high power laser beam outwardly from the axis of the laser beam.

An absorber is positioned circumferentially around the reflecting cone surface in a position to receive the beam as reflected and as spread out by the reflecting cone surface.

The reflecting cone surface is made from a material which is highly reflective for the particular wavelength of the high power laser with which the beam is associated. The reflecting cone material has a surface finish which is a finer finish than the wavelength of the high power laser beam so as to provide good reflectivity.

The absorber is made of a material which is a good absorber for the particular wavelength of the high power laser with which the beam dump is associated.

The angle of the reflecting cone surface is selected so that the reflecting cone surface and the related absorber surface will provide enough bounces of the laser beam off of the surfaces so as to cause essentially all of the power of the laser beam to be absorbed. This angle is selected by taking into consideration the materials and the surface finishes of the reflecting conical surface and the absorber for the particular wavelength of the high power laser beam with which the beam dump is associated.

The reflecting conical surface may be constructed to reflect essentially all of the laser beam or the surface may be constructed to absorb a small part of the laser beam while reflecting the major part of the laser beam.

A heat sink is associated with the absorber and reflecting cone for transferring heat from those components to prevent overheating of the absorber or the reflecting cone.

In a specific embodiment of the beam dump used with a carbon dioxide laser operating at a 10.6 micron wavelength, the reflecting conical surface is a polished copper surface. The surface finish of the polished copper reflecting cone surface is finer than the wavelength of the carbon dioxide laser. In this specific embodiment the absorber is an anodized aluminum sleeve which absorbs at least 90 percent of the power of each reflection of the beam from the conical reflecting surface. In this specific embodiment the sleeve is a press fit or a shrink fit into an encircling copper cylinder. A cooling coil for circulating cooling water about the copper cylinder is soldered to the copper cylinder. The copper cylinder is preferably formed integrally with a central, conically shaped member having the polished reflecting conical surface. The beam dump has a rear face which permits the beam dump to be readily mounted to a pivoting blade or reciprocating member for moving the beam dump into and out of the shuttered off position.

High power beam dump apparatus and methods which incorporate the features described above and which are effective to function above constitute further, specific objects of the present invention invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

DETAILED DESCRIPTION OF THE PREFERRED EMBODIMENTS

Figure 1:
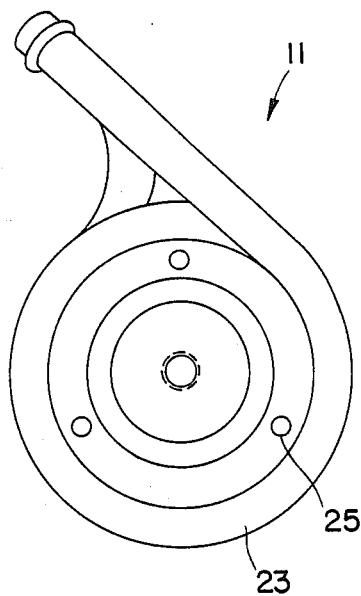
FIG. 1 is an end elevation view of a high power beam dump constructed in accordance with one embodiment of the present invention.
Figure 2:
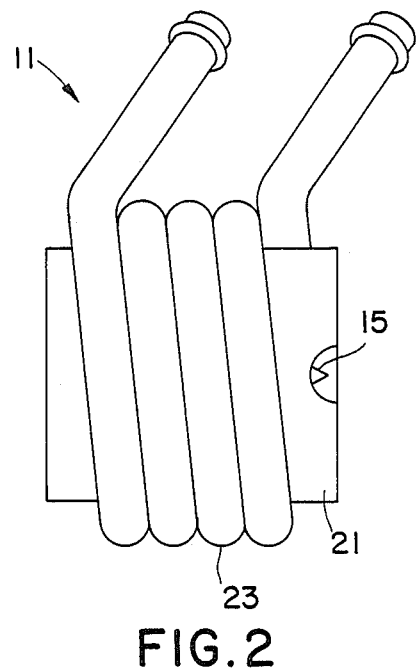
FIG. 2 is a side elevation view of the high power beam dump shown in FIG. 1.
Figure 3:
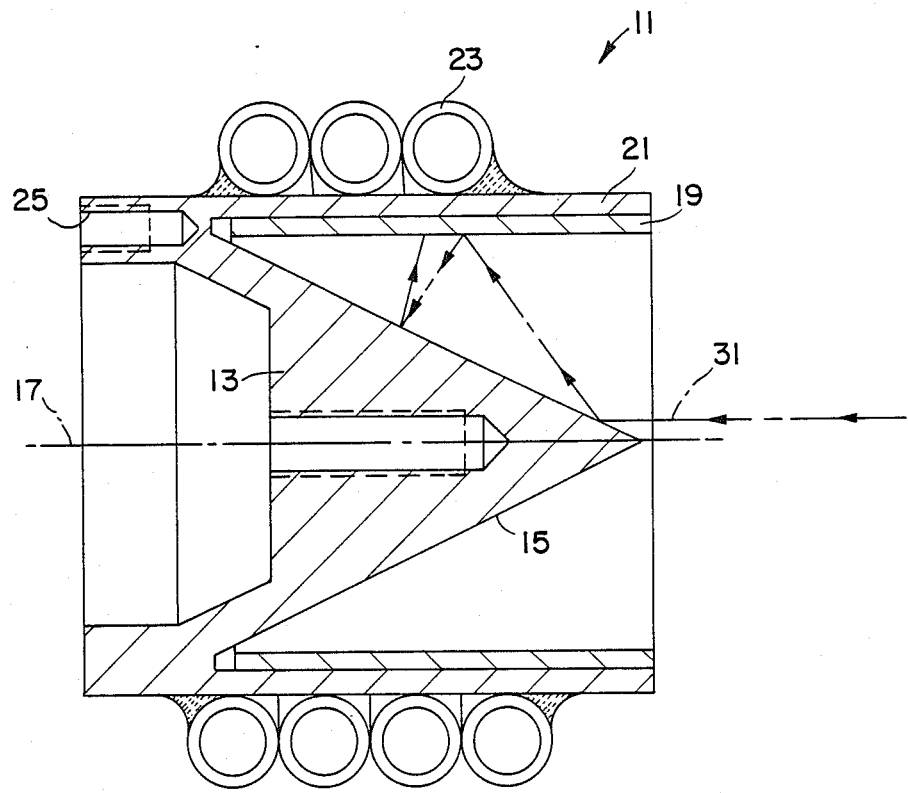
FIG. 3 is a side elevation view like FIG. 2 but somewhat enlarged and partly in cross section to show details of construction.

A high power beam dump constructed in accordance with one embodiment of the present invention is indicated generally by the reference numeral 11 in FIGS. 1–3. The high power beam dump 11 of the present invention in constructed to absorb the power of a high-power laser beam while the beam is shuttered off from contact with the workpiece.

The high power beam dump 11 of the present invention can be used with a high power carbon dioxide laser generally like that illustrated and described in U.S. Pat. No. 4,672,620 issued June 9, 1987 to Slusher et al. and assigned to Spectra-Physics, Inc. and entitled "Fast Axial Flow Carbon Dioxide Laser". This U.S. Pat. No. 4,672,620 is incorporated by reference in this application in accordance with the provisions of Section 608.01(p)B. of the *Manual of Patent Examining Procedure* of the United States Patent and Trademark Office.

It should be noted, however, that the high power beam dump of the present invention is not limited to use with a carbon dioxide laser but is instead usable with a variety of high power laser constructions.

As best shown in FIG. 3, the beam dump 11 comprises a central member 13 having a conical reflecting surface 15. The reflecting surface 15 is formed as a right conical surface and has an axis 17 which is positioned coaxially with the axis of the high power laser beam when the high power laser beam is to be shuttered off from contact with the workpiece by positioning the beam dump 11 between the laser and the work piece.

In this operative position of the high power beam dump 11 the apex of the conical surface 15 thus projects into the central part of the incoming laser beam, as will be described in more detail below.

With continued reference to FIG. 3, the high power beam dump includes, in the specific embodiment shown in FIG. 3, a cylindrical sleeve 19 which absorbs the power of the beam as reflected from the conical surface 15.

The sleeve 19 extends circumferentially about the conical reflecting surface 15 and is mounted within a cylinder 21. The cylinder 21, in the embodiment shown in FIG. 3, is formed integrally with the central member 13.

A cooling coil 23 is soldered or otherwise mounted to the cylinder 21, and water or other suitable cooling fluid is circulated within the coil 23 to a heat sink for transferring heat from the high power beam dump 11 to the heat sink. The central member 13 and associated cylinder 21 thus serve as a chiller for removing heat from the absorber sleeve 19 and from the conical surface 15 to prevent overheating of these parts of the high power beam dump.

The back face of the central member 13 is tapped with threaded openings 25 so that the high power beam dump 11 can be mounted by cap screws to a mounting plate. The mounting plate is connected to suitable actuating mechanism, such as a pivoting lever or a sliding or reciprocating member, for producing the necessary movement of the beam dump 11 into and out of the path of the high power laser beam in the course of shuttering and unshuttering the high power laser beam from the workpiece.

The function of the reflecting cone surface 15 is to reflect all or a large part of the laser beam outwardly and to spread the reflected beam annularly.

The function of the absorber 19 is to absorb substantially all of the power of the laser beam as reflected and as spread out from the conical reflecting surface 15. The angle of the conical surface, the material and the finish of the conical surface and the material and finish of the absorber are related to the characteristics of the wave length of the particular high power laser with which the beam dump 11 is associated so that the beam dump 11 essentially absorbs all of the power of the high power laser beam when the beam dump is in position to shutter off the laser beam from contact with a workpiece.

This essentially complete absorption of the power is accomplished by causing the light from the laser beam to make one or more bounces off of the reflecting conical reflecting surface 15 and the related absorbing surface of the absorber 19.

In FIG. 3 a single ray path 31 of the incoming laser beam is illustrated to show how the light from the beam makes two illustrated bounces off of the reflecting conical surface 15 as the power of the incoming laser beam is essentially entirely absorbed.

The angle of the conical surface 15 shown in FIG. 3 is between 52 and 54 degrees. It can be shown by geometric considerations that the number of bounces of light on both of the surfaces of the cone and absorber together is equal to 180° over the half angle of the cone. With the construction shown in FIG. 3 there would actually be a little over six bounces, but only two bounces are shown in FIG. 3; and, in fact, there is very little power remaining in the reflected beam after the second bounce of the reflected beam off of the absorber 19 because the particular absorber used in the embodiment shown in FIG. 3 absorbs about 97 percent of the light and reflects only about 3 percent of the light on each bounce off of the surface of the absorber. So for a 2 kilowatt beam, the first bounce would reflect 60 watts and the next bounce would reflect 3 percent of that 60 watts which is 1.8 watts. The third bounce would reflect 3 percent of the 1.8 watts which would be 54 milliwatts.

As noted above, the material and finish of the reflecting cone 15, the material and finish of the absorber 19 and the geometry of the reflecting and absorbing surfaces are related to the wavelength of the particular high power laser with which the beam dump 11 is associated so that the beam dump 11 absorbs essentially all of the power of the laser beam.

The particular material for the reflecting cone surface 15 is highly reflective for the particular laser, and the surface finish of the reflecting cone surface 15 is finer than the wavelength of the particular laser in order to get good reflectivity.

The material and the surface finish of the absorber 19 is also selected for the particular wavelength of the related high power laser so that the absorber is a good absorber for that wavelength.

The angle of the conical surface 15 is constructed to get the number of multiple bounces required to insure essentially complete absorption of the power of the laser beam with the materials and finishes used for the reflecting cone 15 and the absorber 19.

In the specific embodiment of the invention illustrated in FIGS. 1–3 the beam dump 11 is used to absorb the power of a high power carbon dioxide laser. The central part 13 is made of copper, and the surface 15 is polished to reflect substantially all of the light with very little absorption at the surface 15.

The absorber 19 is an anodized aluminum sleeve which absorbs at least 97 percent of the light on each bounce of the reflected beam off of the absorber.

For a carbon dioxide laser the conical reflecting surface 15 can also be gold plated.

This conical surface 15 can also be an aluminum piece which is bolted to the central member 13. Aluminum is somewhat easier to polish than copper.

There are other constructions that can be used effectively with a carbon dioxide laser. By way of one example, the conical reflecting surface 15 can be made slightly absorptive. An Ebanol C coating on the copper produces an oxidized copper that absorbs some of the initial light. In some cases this is an advantage because it reduces somewhat the power being reflected. For higher powers there can be a benefit in using a slightly absorbing cone which is also cooled so that light is absorbed everywhere and not just on the absorber 19.

In the specific construction shown in FIG. 3 the absorber 19 is an anodized aluminum sleeve which is pressed into the copper cylinder 21.

This sleeve 19 can also be formed with a slight draft angle and then installed by a shrink fit. In this construction the aluminum sleeve 19 is cooled, and the copper cylinder 21 is heated. The cooled aluminum sleeve 19 is dropped in and is then permitted to expand as it warms up, and this produces a thermal shrink fit.

The aluminum sleeve 19 can also be threaded into position.

In the specific embodiments shown in FIG. 3 the anodized aluminum sleeve has a 3 percent or less reflectivity for 10.6 micron radiation.

When the beam dump 11 is used for lasers, other than carbon dioxide lasers other combinations of materials may be preferred. For example, the absorber 19 might be an oxidized copper piece, or a graphite ring rather than aluminum.

And, as noted above, the angle of the conical surface 15 can be adjusted to provide more or less bounces, depending upon the desirability of the particular number of bounces for a particular laser beam wavelength and the related reflecting cone and absorber materials and surfaces.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

We claim:

1. A high power beam dump for absorbing the power of a high power laser beam while the laser beam is shuttered off from contact with a workpiece, said high power beam dump comprising,
   reflecting cone means for reflecting and spreading the high power laser beam outwardly from the axis of the laser beam and
   absorber means for absorbing the power of the beam as reflected from the reflecting cone means, and
   heat sink means for transferring heat from the absorber means to the heat sink means for preventing overheating of the absorber means.

2. The invention defined in claim 1 wherein the heat sink means also transfer heat from the reflecting cone means.

3. The invention as defined in claim 2 wherein the laser is a carbon dioxide laser and the reflecting cone material is polished copper and has a surface finish which is essentially totally reflective.

4. A high power beam dump for absorbing the power of a high power laser beam while the laser beam is shuttered off from contact with a workpiece, said high power dump comprising,
   reflecting cone means for reflecting and spreading the high power laser beam outwardly from the axis of the laser beam and
   absorber means for absorbing the power of the beam as reflected from the reflecting cone means, and wherein the laser is a carbon dioxide laser and wherein the reflecting cone means has an outer finish which is highly reflective and the absorber means comprise an anodized aluminum material.

5. A high power beam dump for absorbing the power of a high power laser beam while the laser beam is shuttered off from contact with a workpiece, said high power beam dump comprising,
   reflecting cone means for reflecting and spreading the high power laser beam outwardly from the axis of the laser beam and
   absorber means for absorbing the power of the beam as reflected from the reflecting cone means, and
   wherein the reflective cone means has a conical reflecting surface disposed at an angle effective to produce multiple bounces of the reflected laser beam between said reflecting surface and a related absorbing surface of the absorber means.

6. A high power beam dump for absorbing the power of a high power laser beam while the laser beam is shuttered off from contact with a workpiece, said high power beam dump comprising,
   reflecting cone means for reflecting and spreading the high power laser beam outwardly from the axis of the laser beam and
   absorber means for absorbing the power of the beam as reflected from the reflecting cone means, and
   wherein the laser is a $CO_2$ laser, the absorber means includes an outer copper carrier and an anodized aluminum sleeve absorber pressed into the outer copper carrier.

7. A method of absorbing the power of a high power laser beam while the high power laser beam is shuttered off from contact with a workpiece, said method comprising,
   positioning a reflecting cone in the path of an incoming beam with the axis of the reflecting cone aligned with the axis of the beam and with the apex of the cone projecting into the incoming beam,
   reflecting and spreading the high power laser beam outwardly from the axis of the laser beam by reflection off of the surface of the reflecting cone,
   positioning an absorber structure circumferentially about the reflecting cone in a position to receive the beam as reflected and as spread out by the reflecting cone, and
   absorbing in the absorber the power of the beam as reflected from the reflecting cone.

8. The invention defined in claim 7 including transferring heat from the absorber and from the reflecting cone to a heat sink to prevent overheating of the absorber and overheating of the reflecting cone.

\* \* \* \* \*